(12) United States Patent
Bhagwan et al.

(10) Patent No.: US 7,856,639 B2
(45) Date of Patent: Dec. 21, 2010

(54) MONITORING AND CONTROLLING APPLICATIONS EXECUTING IN A COMPUTING NODE

(75) Inventors: Varun Bhagwan, San Jose, CA (US); Daniel Frederick Gruhl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 12/124,224

(22) Filed: May 21, 2008

(65) Prior Publication Data

US 2008/0222723 A1 Sep. 11, 2008

Related U.S. Application Data

(63) Continuation of application No. 11/415,035, filed on May 1, 2006, now abandoned.

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/319
(58) Field of Classification Search ................. 719/319
See application file for complete search history.

(56) References Cited

U.S. PATENT DOCUMENTS

| 6,016,393 | A | 1/2000 | White et al. |
| 6,125,401 | A * | 9/2000 | Huras et al. ................. 719/310 |
| 6,134,671 | A * | 10/2000 | Commerford et al. .......... 714/4 |
| 6,519,642 | B1 | 2/2003 | Olsen et al. |
| 6,687,847 | B1 | 2/2004 | Aguilera et al. |
| 6,742,123 | B1 | 5/2004 | Foote |
| 6,772,411 | B2 | 8/2004 | Hayes et al. |
| 6,799,195 | B1 | 9/2004 | Thibault et al. |
| 6,802,067 | B1 * | 10/2004 | Camp et al. .................. 719/315 |
| 6,810,437 | B1 | 10/2004 | Nihei |
| 2004/0098490 | A1 | 5/2004 | Dinker et al. |
| 2004/0123117 | A1 | 6/2004 | Berger |
| 2004/0139334 | A1 | 7/2004 | Wiseman |

(Continued)

OTHER PUBLICATIONS

Yin et al.; "Separating Agreement from Execution for Byzantine Fault Tolerant Services"; Oct. 22, 2003, ACM, pp. 253-267.

(Continued)

*Primary Examiner*—Hyung S Sough
*Assistant Examiner*—Timothy A. Mudrick
(74) *Attorney, Agent, or Firm*—Schmeiser, Olsen & Watts

(57) ABSTRACT

A method and system for monitoring and controlling applications executing on computing nodes of a computing system. A status request process, one or more control processes, an untrusted application and one other application are executed on a computing node. The status request process receives and processes requests for the statuses of the untrusted and the other application. A first control process controls the execution of the untrusted application. A second control process controls the execution of the other application. The execution of the untrusted application terminates based on a failure of the untrusted application. A capability of the status request process to receive and process the requests for statuses, and a capability of the second control process to control the execution of the other application are preserved in response to the termination of the untrusted application.

20 Claims, 7 Drawing Sheets

U.S. PATENT DOCUMENTS

2005/0066030 A1  3/2005  Barnhouse et al.

OTHER PUBLICATIONS

Galtier et al.; Expressing Meaningful Processing Requirements among Heterogeneous Nodes in an Active Network; National Institute of Standards and Technology; pp. 20-28.

Milojicic et al.; Process Migration; ACM Computing Surveys, vol. 32, No. 3, Sep. 2000; pp. 241-299.

Valetto et al.; Using Process Technology to Control and Coordinate Software Adaptation; IEEE; 2003; 0-7695-1877-X/03; pp. 262-272.

Han et al.; A comparative analysis of virtual versus physical process-migration strategies for distributed modeling and simulation of mobile computing networks; Wireless Networks 4; 1998; pp. 365-378.

Agrawal et al.; Vinci: A Service-Oriented Architecture for Rapid Development of Web Applications; Published in Computer Networks 39(5); 2002; WWW10, May 1-5, 2001, Hong Kong; ACM 1-58113-348-0/01/0005; pp. 355-365.

Gruhl et al.; How to build a WebFountain: An architecture for very large-scale text analytics; IBM Systems Journal, vol. 43, No. 1; 2004; 0018-8670/04; pp. 64-77.

* cited by examiner

MONITORING AND CONTROLLING APPLICATIONS EXECUTING IN A COMPUTING NODE

This application is a continuation application claiming priority to Ser. No. 11/415,035, filed May 1, 2006.

BACKGROUND OF THE INVENTION

1. Technical Field

The present invention relates to a method and system for monitoring and controlling applications executing in a computing node of a computing system, and more particularly to a technique for monitoring and controlling a plurality of applications in a computing node of a distributed computing system, where one or more applications of the plurality of applications are untrusted applications.

2. Related Art

Conventional process monitoring tools do not include adequate built-in sandboxing features to allow proper execution of unreliable code in a distributed or clustered computing system, where the code is not tested or not exhaustively tested. Insufficient testing of code is commonplace in a text analytics platform such as the WebFountain cluster, due to the difficulty of simulating the complex computing environment. The WebFountain cluster is a large text analytics platform, which includes applications that provide crawling of the Internet, storage and access of the data resulting from the crawling, and indexing of the data. Further, inadequately tested code in such a complex computing environment leads to Byzantine faults that are not sufficiently protected against by known monitoring tools. A Byzantine fault is an arbitrary failure mode characterized by the erroneous, inconsistent and potentially malicious behavior of system components. Still further, known monitoring tools do not ensure, in a programmatic manner, that a failure of an unreliable child application that causes the child's parent application to also fail does not adversely affect critical components in the rest of the computing system (e.g., by causing or facilitating a failure of other child applications of the failed parent application). Thus, there exists a need to overcome at least one of the preceding deficiencies and limitations of the related art.

SUMMARY OF THE INVENTION

In first embodiments, the present invention provides a method of monitoring and controlling applications executing on a plurality of computing nodes of a computing system, comprising:

executing, on a computing node of the plurality of computing nodes, a status request process included in a plurality of processes capable of being executed on the computing node;

executing, on the computing node, one or more control processes included in the plurality of processes;

executing, on the computing node, an untrusted application of a plurality of applications capable of being executed on the computing node, the executing the untrusted application including performing a first execution of the untrusted application, and the untrusted application designated as likely to experience a failure based on pre-defined criteria;

executing, on the computing node, another application of the plurality of applications, the executing the another application including performing a second execution of the another application, wherein the another application is different from the untrusted application;

receiving and processing, by the status request process, a first request for a first status of the untrusted application, receiving and processing, by the status request process, a second request for a second status of the another application;

controlling, exclusively by a first control process of the one or more control processes, the first execution of the untrusted application;

controlling, exclusively by a second control process of the one or more control processes, the second execution of the another application;

terminating the first execution of the untrusted application based on a failure of the untrusted application; and preserving, in response to the terminating, a capability of the status request process to perform the receiving and the processing the first request and to perform the receiving and the processing the second request, and a capability of the second control process to perform the controlling the second execution of the another application.

Advantageously, the present invention provides a technique for monitoring the status and performance, and controlling the execution of a plurality of applications on a computing node while isolating a failure of one of the applications (e.g., an untrusted application). The isolation of the failure allows the monitoring and controlling of the other applications to be preserved.

DETAILED DESCRIPTION OF THE INVENTION

Overview

The present invention provides a technique for monitoring and controlling a plurality of applications running on multiple computing nodes of a computing system (e.g., a distributed or clustered computing environment). One or more applications of the plurality of applications are executed on each of the computing nodes. At least one of the applications executing on the computing nodes is an untrusted application. The configuration of each computing node facilitates the isolation of a failure of an untrusted application so that the rest of the computing system is unaffected by the failure (i.e., in response to the failure, other applications and processes of the computing system do not fail and the monitoring and controlling capabilities are preserved). As used herein, an untrusted application is defined to be an application (a.k.a. process) designated as likely to fail based on pre-defined criteria. For example, an application is untrusted if the code of the application is untested or not exhaustively tested and the application is designed to be executed in a complex computing environment that is difficult to simulate (e.g., the WebFountain cluster).

The aforementioned failure isolation is provided by a first process (a.k.a. status request process) and a second process (a.k.a. control process) executing on each computing node, whereby the first process's processing of a request for any application's status is segregated from the second process's control of the execution of the application. In this way, sandboxing of the application's execution is facilitated.

Figure 1:
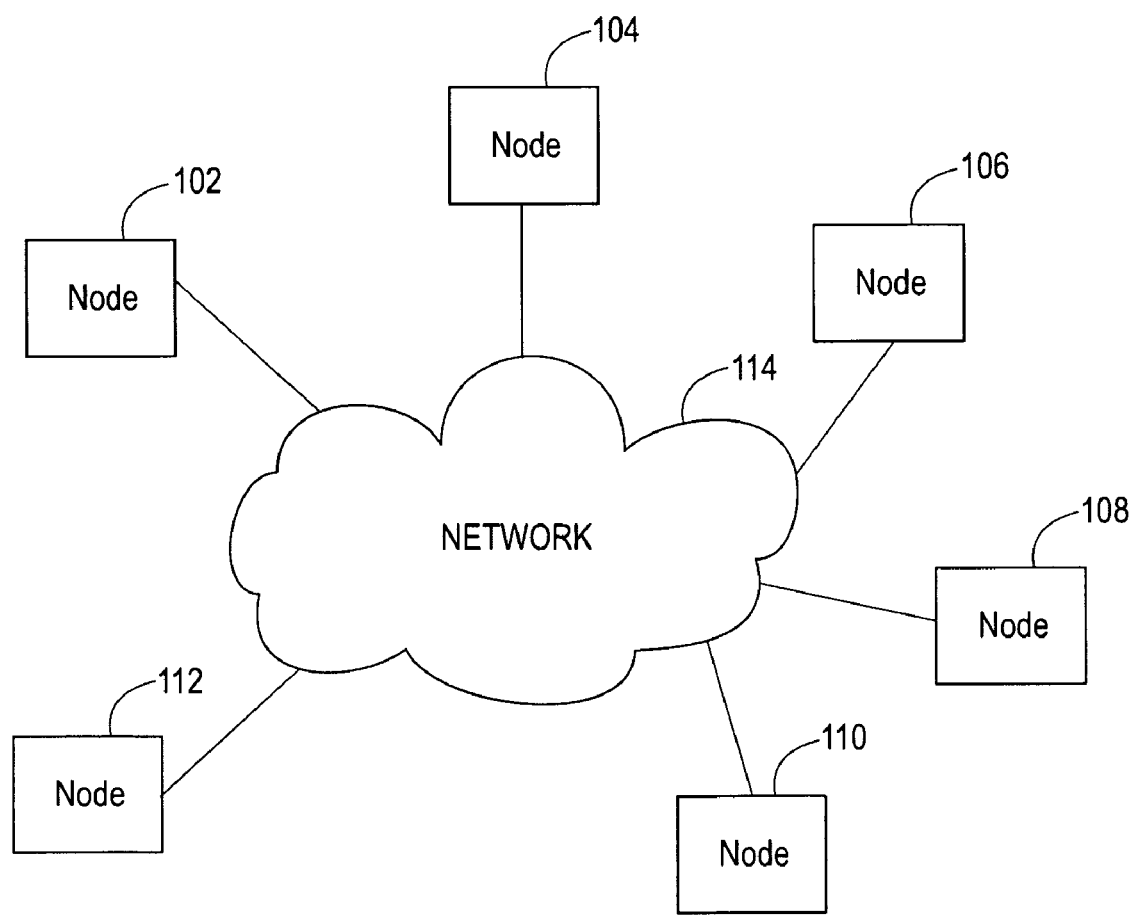
FIG. 1 is a block diagram of a system for monitoring and controlling applications executing on a computing node of a distributed or clustered computing system, in accordance with embodiments of the present invention.

FIG. 1 is a block diagram of a system for monitoring and controlling applications executing on a computing node of a distributed or clustered computing system, in accordance with embodiments of the present invention. System 100 includes multiple computing nodes 102, 104, 106, 108, 110, 112, which communicate with each other via a network 114. Each computing node is a computing unit or computing system such as a personal computer, workstation, client, or server. Each of the multiple computing nodes 102-112 can employ any one of the configurations shown in FIGS. 2A, 2B and 2C. A computing node includes a plurality of applications executing thereon, where one or more of the applications are untrusted.

System 100 provides resources shared among computing nodes 102-112. The shared resources can include, for example, shared data storage devices (not shown). Network 114 can be any system that provides communication among computing nodes 102-112, such as a local area network, wide area network, or global data transmission network (e.g., the Internet).

Computing Node Configurations

Figure 2A:
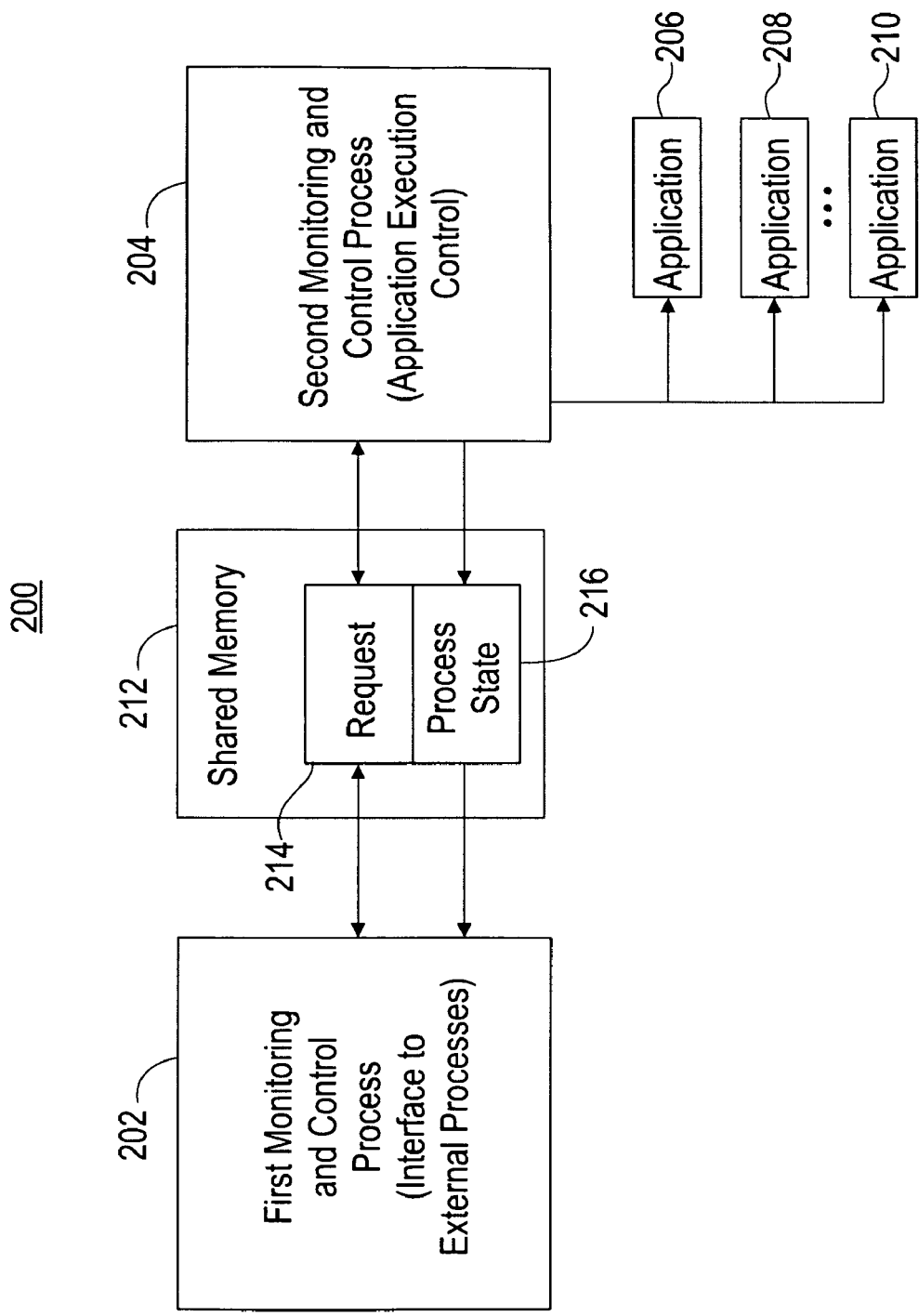
FIG. 2A is a block diagram of a computing node in a first implementation of the system of FIG. 1, where multiple applications executing on the computing node are associated with a single application execution control process, in accordance with embodiments of the present invention.

FIG. 2A is a block diagram of a computing node in a first implementation of the system of FIG. 1, where multiple applications executing on the computing node are associated with a single application execution control process, in accordance with embodiments of the present invention. In a first embodiment, a computing node of system 100 (see FIG. 1) is a computing node 200, which includes a first monitoring and control process 202 (hereinafter referred to as the "first process") and a second monitoring and control process 204 (hereinafter referred to as the "second process"). First process 202 provides overall coordination of the functions of computing node 200 and an interface for communication between computing node 200 and processes (not shown) that are external to computing node 200. The interface functionality of first process 202 can be implemented by a remote procedure call system or a service-oriented architecture interface (e.g., a Vinci interface provided by International Business Machines Corporation of Armonk, N.Y.). Second process 204 provides control of an execution of any application of a plurality of applications running on computing node 200 (e.g., applications 206, 208, 210). One or more of applications 206, 208, 210 are designated as untrusted. First process 202 and second process 204 communicate with each other via a shared memory 212. Shared memory 212 is divided into two size-configurable portions. A first portion 214 (a.k.a. request portion) of shared memory 212 is used to communicate commands to second process 204. A second portion 216 (a.k.a. process state portion) of shared memory 212 is a location to which second process 204 periodically writes the status of all applications running under the control of second process 204. The aforementioned periodic writing is performed at pre-defined time intervals. First process 202 retrieves from process state portion 216 the application statuses that second process 204 wrote to the process state portion. In one embodiment, this status retrieval is performed by first process 202 periodically at pre-defined intervals.

In one embodiment, computing node 200 (see FIG. 2A) is configured to include a second process (not shown) controlling the execution of first process 202 (see FIG. 2A) in response to the presence of one or more untrusted applications among the plurality of applications 206, 208, 210. This configuration facilitates the automatic restart of first process 202 by the aforementioned second process in response to a failure of the first process.

Figure 2B:
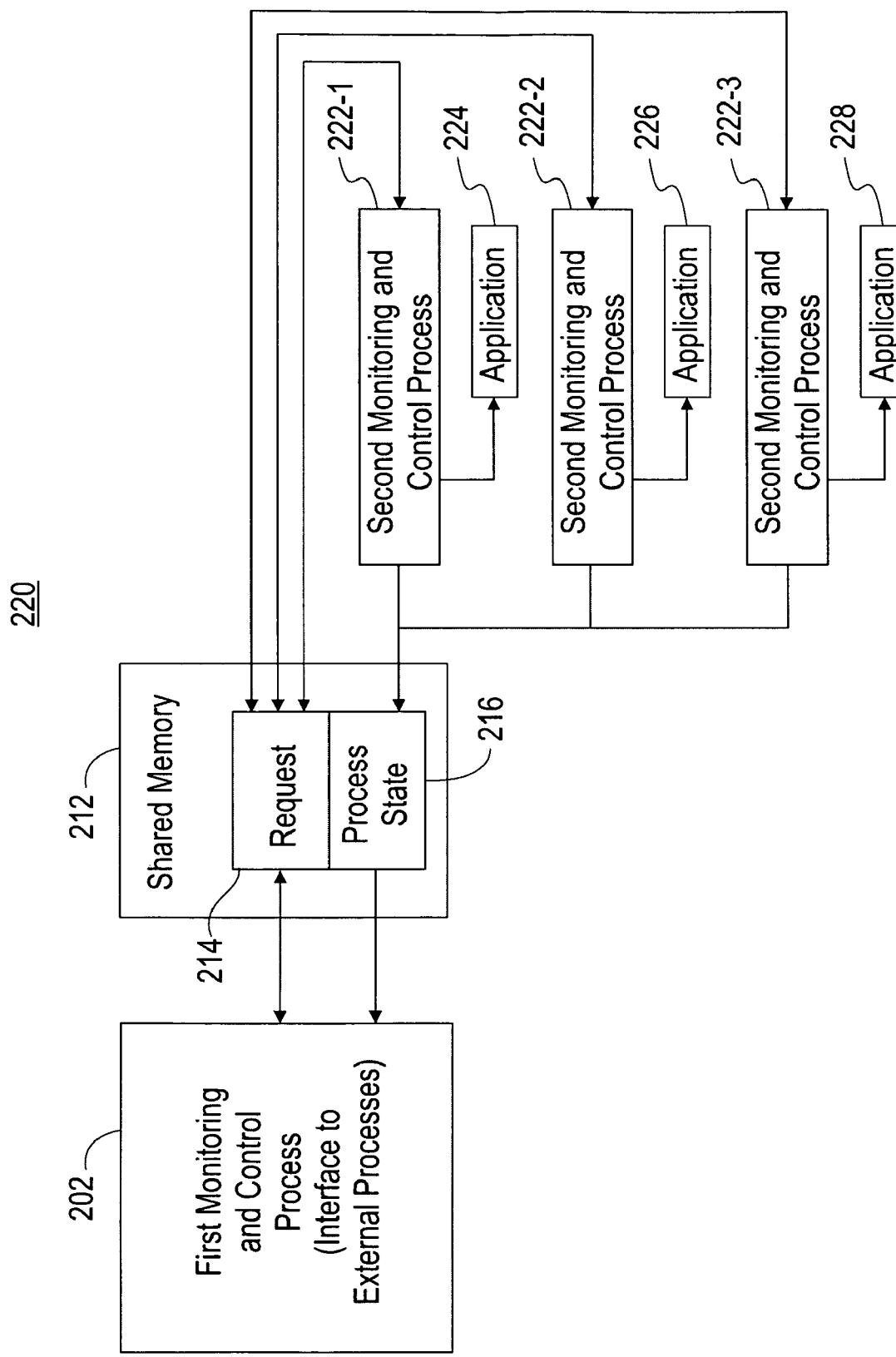
FIG. 2B is a block diagram of a computing node in a second implementation of the system of FIG. 1, where multiple applications executing on the computing node are associated with multiple application execution control processes in a one-to-one correspondence, in accordance with embodiments of the present invention.

FIG. 2B is a block diagram of a computing node in a second implementation of the system of FIG. 1, where multiple applications executing on the computing node are associated with multiple application execution control processes in a one-to-one correspondence, in accordance with embodiments of the present invention. In a second embodiment, computing node 220 of system 100 (see FIG. 1) includes a first monitoring and control process 202 (a.k.a. "first process") and a plurality of second monitoring and control processes 222-1, 222-2, 222-3 (hereinafter, collectively referred to as "second processes 222"). First process 202 and second processes 222 communicate via shared memory 212. First process 202, shared memory 212 and shared memory's request portion 214 and process state portion 216 share the functionality of their analogous components in computing node 200 of FIG. 2A. Instead of the computing node including only one second process which controls multiple applications (see computing node 200 of FIG. 2A), computing node 220 includes a plurality of second processes 222, where each second process provides control for a single corresponding application. That is, second processes 222-1, 222-2, and 222-3 provide control of the execution of application 224, application 226 and application 228, respectively. Similar to FIG. 2A, second processes 222 periodically write at pre-defined time intervals the statuses of applications 224, 226, 228 to process state portion 216. Further, one or more of applications 224, 226 and 228 are designated as untrusted.

Figure 2C:
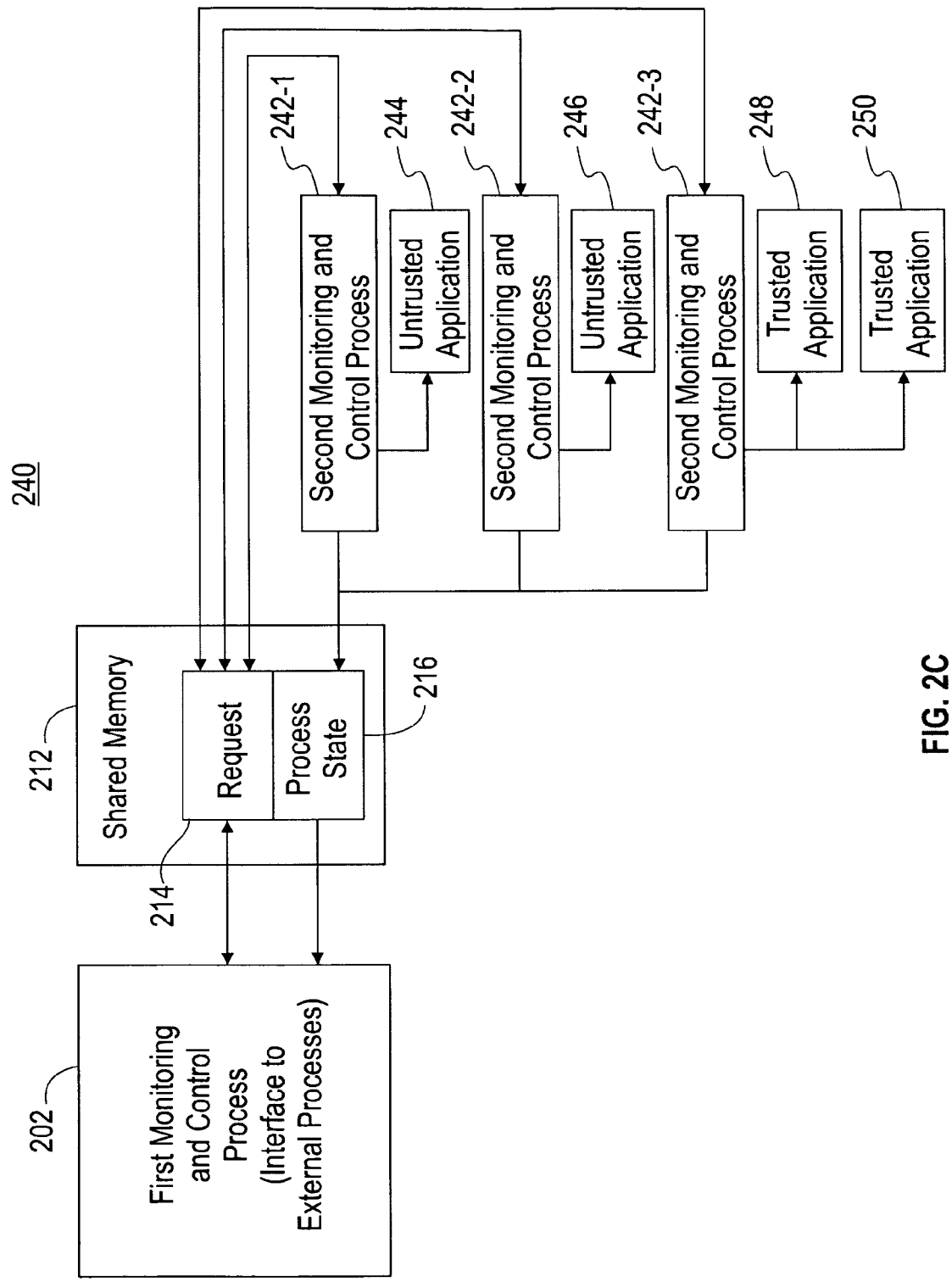
FIG. 2C is a block diagram of a computing node in a third implementation of the system of FIG. 1, where each untrusted application executing on the computing node is associated with an application execution control process in a one-to-one correspondence, and multiple trusted applications running on the computing node are associated with a single application execution control process, in accordance with embodiments of the present invention.

FIG. 2C is a block diagram of a computing node in a third implementation of the system of FIG. 1, where each untrusted application executing on the computing node is associated with an application execution control process in a one-to-one correspondence, and multiple trusted applications running on the computing node are associated with a single application execution control process, in accordance with embodiments of the present invention. In a third embodiment, computing node 240 of system 100 (see FIG. 1) includes first process 202 and a plurality of second monitoring and control processes 242-1, 242-2, 242-3 (hereinafter, collectively referred to as "second processes 242"). First process 202 and second processes 242 communicate via shared memory 212. First process 202, shared memory 212 and shared memory's request portion 214 and process state portion 216 share the functionality of their analogous components in computing node 200 of FIG. 2A and computing node 220 of FIG. 2B. Instead of the computing node including only one second process which controls all of a plurality of applications on the node (see FIG. 2A), and instead of the computing node including second processes controlling applications in a one-to-one correspondence, computing node 240 includes a plurality of second processes 242, where one or more second processes 242-1, 242-2 control the execution of untrusted applications 244, 246 in a one-to-one correspondence, and where a single second process 242-3 controls the execution of one or more trusted applications 248, 250. Similar to FIGS. 2A and 2B, second processes 242 periodically write at pre-defined time intervals the statuses of applications 244, 246, 248, 250 to process state portion 216.

Comparing the computing node configurations of FIGS. 2A, 2B and 2C, the one second process per node arrangement of FIG. 2A provides relatively simple application control, and consumes computing resources (e.g., CPU resources and memory resources) more efficiently (i.e., the only one second process of FIG. 2A consumes fewer resources than the multiple second processes of FIG. 2B). As compared to FIG. 2A, the one second process per application arrangement of FIG. 2B enhances the isolation of a failed application from the rest of the computing system. The computing node arrangement of FIG. 2C is a mixture of FIG. 2A and FIG. 2B, and facilitates balancing the tradeoff between resource usage and the protection provided by the isolation of application failures. As compared to FIG. 2B, the computing node of FIG. 2C consumes fewer resources as the number of trusted applications increases, but still provides the same level of failure isolation for untrusted applications.

In one embodiment, computing nodes 102-112 (see FIG. 1) of system 100 (see FIG. 1) include one of the configurations shown in FIG. 2A, 2B or 2C. Alternatively, computing nodes 102-112 (see FIG. 1) include any combination of configurations illustrated in FIGS. 2A, 2B and 2C.

In one embodiment, shared memory 212 in FIG. 2A, 2B or 2C is a System V Inter-Process Communication (IPC) shared memory. Synchronized access to System V IPC shared memory by first process 202 (see FIGS. 2A, 2B and 2C) and the at least one second process (e.g., second process 204 of FIG. 2A) is provided by System V IPC semaphores.

Application Monitoring and Control

Figure 3:
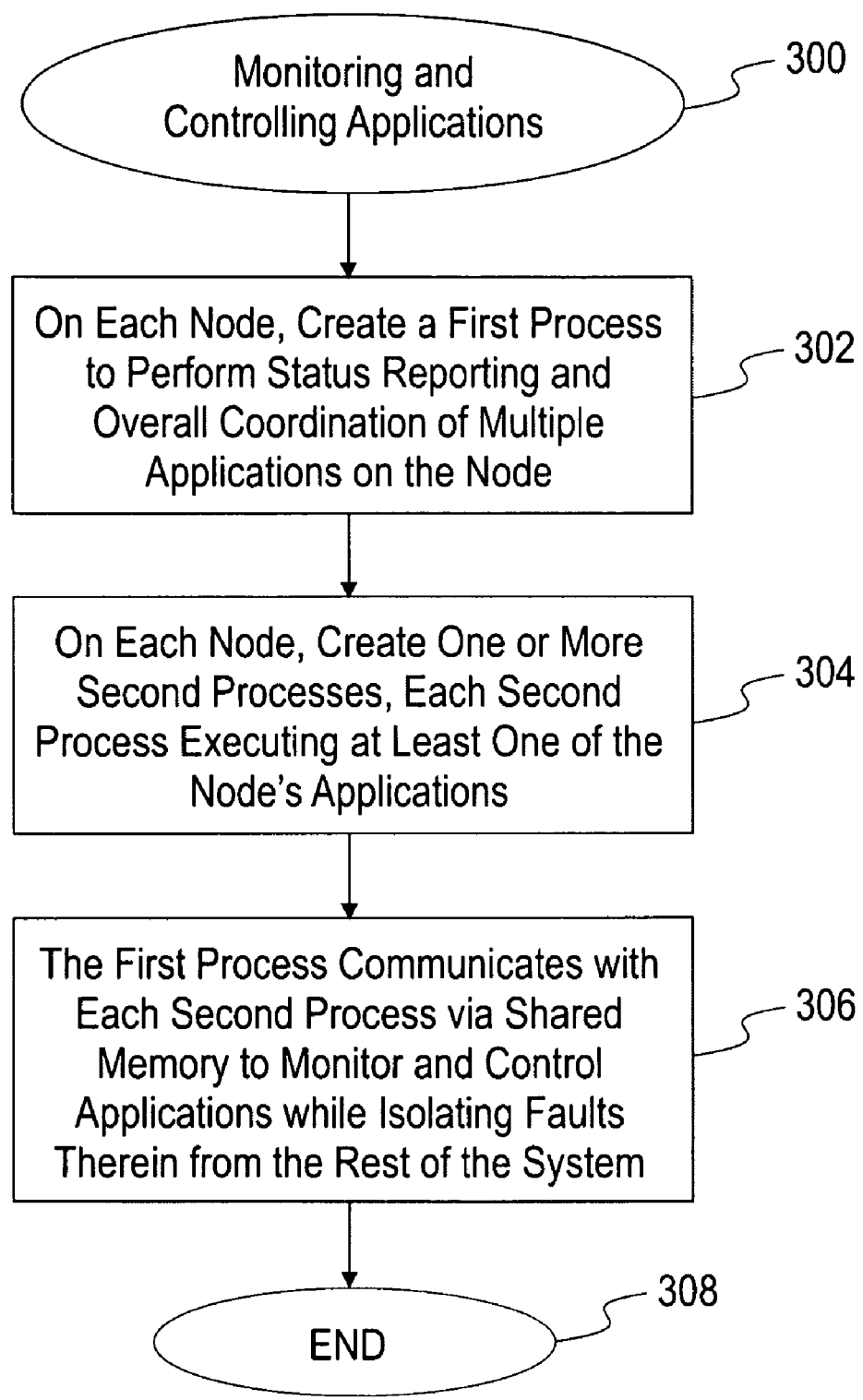
FIG. 3 is a flow chart of a process of monitoring and controlling applications running on a computing node of FIG. 2A, 2B or 2C, in accordance with embodiments of the present invention.

FIG. 3 is a flow chart of a process of monitoring and controlling applications executing on a computing node of FIG. 2A, 2B or 2C, in accordance with embodiments of the present invention. The application monitoring and controlling process starts at step 300. Unless otherwise noted, components of computing node 200 of FIG. 2A are referenced relative to the discussion of FIG. 3 presented below. It will be understood, however, that the process of FIG. 3 can also be implemented by components of computing node 220 (see FIG. 2B) or by components of computing node 240 (see FIG. 2C).

A plurality of processes including a status request process and one or more control processes are capable of being executed on computing node 200 (see FIG. 2A). In step 302, a status request process (e.g., first process 202 of FIG. 2A) is created on each computing node 102-112 (see FIG. 1). First process 202 (see FIG. 2A) executes on computing node 200 (see FIG. 2A), and its capabilities include receiving and processing requests for a status of application 206, 208 or 210 (see FIG. 2A), providing an interface to processes external to computing node 200 (see FIG. 2A), and providing an overall coordination of the plurality of applications 206, 208, 210 executing on computing node 200 (see FIG. 2A). Specific functions relative to the aforementioned capabilities of first process 202 (see FIG. 2A) are described below.

In step 304, one or more control processes (e.g., second process 204 of FIG. 2A) are created on each computing node 102-112 (see FIG. 1). That is, each computing node of system 100 (see FIG. 1) includes one of the following configurations: (1) a single second process 204 (see FIG. 2A) capable of controlling the execution of the plurality of applications 206, 208, 210 (see FIG. 2A), (2) a plurality of second processes 222 (see FIG. 2B) capable of controlling the execution of a plurality of applications 224, 226, 228 (see FIG. 2B) in a one-to-one correspondence, and (3) a plurality of second processes 242 (see FIG. 2C) where one or more second processes 242-1, 242-2 (see FIG. 2C) are capable of controlling the execution of one or more untrusted applications 244, 246 (see FIG. 2C), in a one-to-one correspondence, and where a single second process 242-3 (see FIG. 2C) is capable of controlling the execution of one or more trusted applications 248, 250 (see FIG. 2C).

In step 306, applications 206, 208 and 210 (see FIG. 2A) are executed on computing node 200 (see FIG. 2A), and first process 202 (see FIG. 2A) communicates with second process 204 via shared memory 212 (see FIG. 2A) to monitor and control applications 206, 208, 210 (see FIG. 2A) via status request operations and application control operations.

A status request process (e.g., first process 202 of FIG. 2A) performs status request operations to monitor applications 206, 208, 210 (see FIG. 2A). These status request operations include receiving and processing, by first process 202 (see FIG. 2A), a first request for a first status of an untrusted application (e.g., application 206 of FIG. 2A). The first request can be received from, for example, a process external to computing node 200 (see FIG. 2A). Further, the status request operations include receiving and processing, by first process 202 (see FIG. 2A), a second request for a second status of another application (e.g., application 208 of FIG. 2A). The second request can also be received from, for example, a process external to computing node 200 (see FIG. 2A).

The one or more control processes (e.g., second process 204 of FIG. 2A) of a computing node (e.g., computing node 200 of FIG. 2A) perform application control operations to control the execution of applications on the computing node. The control operations performed by second process 204 (see FIG. 2A) include starting, stopping and restarting the execution of one or more of the applications 206, 208, 210 (see FIG. 2A).

The specific commands and operations that provide the status request operations and the application control operations are described below.

In step 306, an untrusted application (e.g., application 206) fails and its execution is thereby terminated. The failure of the untrusted application is isolated from the rest of the system 100 (see FIG. 1) that includes computing node 200 (see FIG. 2A). By isolating the failure of an application, the remaining parts of system 100 (see FIG. 1) are not adversely affected by the failure. That is, in response to the termination of the failed untrusted application, the capability of first process 202 (see FIG. 2A) to perform status request operations and the capability of second process 204 (see FIG. 2A) to perform application control operations are preserved. For example, in response to a failure of application 206 (see FIG. 2A), a request for a status of application 206 or 208 (see FIG. 2A) is still successfully received and processed by first process 202 (see FIG. 2A). Further, in this example, second process 204 (see FIG. 2A) continues to execute and continues to control the execution of the applications that have not terminated (e.g., application 208 and 210 of FIG. 2A). The application monitoring and controlling process ends at step 308.

Segregation of status request and application control operations facilitates the preservation of the capabilities to perform such operations in response to a failure of an untrusted application. This segregation is provided by performing the status request operations exclusively by the status request process (e.g., first process 202 of FIG. 2A), and by performing the application control operations exclusively by at least one control process of the one or more control processes (e.g., second process 204 of FIG. 2A) executing on the computing node (e.g., computing node 200 of FIG. 2A). To ensure this segregation, the first process is not identical to any of the second processes.

In one embodiment, computing node 240 (see FIG. 2C) separates a control of an untrusted application 244 (see FIG. 2C) from a control of another application 248 (see FIG. 2C). As used herein, control of an application is defined to be control of an execution of the application. This separation of control is provided by a first control process 242-1 (see FIG. 2C) exclusively controlling the execution of untrusted application 244 (see FIG. 2C) and by a second control process 242-3 (see FIG. 2C) exclusively controlling the execution of the other application 248 (see FIG. 2C). To ensure the separation of control, the first control process is different from the second control process. Moreover, this separation of control facilitates the aforementioned preservation of the capabilities relative to the status request operations and the application control operations. For example, the separation of control allows control of the execution of application 248 (see FIG. 2C) to continue after untrusted application 244 (see FIG. 2C) fails. It will be understood to those skilled in the art that this embodiment can also utilize an untrusted application 246 (see FIG. 2C) in place of trusted application 248 (see FIG. 2C).

In the configuration of FIG. 2A, the preservation of the aforementioned capabilities is also facilitated by a particular division of types of tasks performed by first process 202 (see FIG. 2A) and second process 204 (see FIG. 2A). The first process performs tasks that utilize more complex code (i.e., "heavy-duty tasks") than the code utilized by the second process. These heavy-duty tasks include tasks performed by agents that provide application monitoring and sandboxing features. For instance, the first process is responsible for the heavy-duty tasks of coordinating external interactions, ensuring automatic restarts, and performing cleanups. In contrast, the second process performs no heavy-duty or non-stable tasks. Instead, the second process includes non-complex code that employs only system calls that are stable (e.g., Linux system calls such as fork, wait, etc.). This division of the types of tasks performed by the first and second processes increases the likelihood that the second process will continue to execute in response to a failure of one of the applications running under the control of the second process. That is, the stability of the system calls employed by the second process facilitates the continued operation of the second process in response to the application failure.

In one embodiment, first process 202 (see FIG. 2A) is communicating with one or more external processes, and therefore first process 202 (see FIG. 2A) can fail due to network issues, receiving improper requests, etc. In response to first process 202 (see FIG. 2A) failing, transparent reparenting of applications 206, 208, 210 (see FIG. 2A) and a restart of applications 206, 208, 210 (see FIG. 2A) are not required. Instead, the present invention isolates the failure of first process 202 (see FIG. 2A) and facilitates the continuing operability of second process 204 (see FIG. 2A).

The capabilities of first process 202 (see FIG. 2A) include the ability to receive or initiate the following commands, and communicate the commands to second process 204 (see FIG. 2A):

(1) automatically restart second process 204 (see FIG. 2A) in response to a termination of the second process, (2) start an application 206, 208 or 210 (see FIG. 2A), (3) stop an application 206, 208 or 210 (see FIG. 2A), (4) clean up an application 206, 208 or 210 (see FIG. 2A), (5) obtain a log of standard-output and/or standard-error for an application 206, 208 or 210 via a corresponding standard-output and/or standard-error logging operation performed by second process 204 (see FIG. 2A), (6) stop all of the plurality of applications 206, 208, 210 (see FIG. 2A), (7) obtain a status of all applications of the plurality of applications 206, 208, 210 from process state portion 216 (see FIG. 2A), (8) obtain a status of a single application 206, 208 or 210 (see FIG. 2A) from process state portion 216 (see FIG. 2A), (9) restart an application 206, 208 or 210 (see FIG. 2A), and

(10) shut down computing node 200 (see FIG. 2A) or system 100 (see FIG. 1).

The above-listed commands that start, restart, and stop one or more applications, or obtain a status of one or more applications can be initiated by first process 202, or by a process external to the computing node on which first process 202 is running.

The monitoring and control functionality of one of the second processes (e.g., second process 204 of FIG. 2A) includes the capability to perform the operations listed below. Unless otherwise indicated, the operations listed below can be performed by, for example, second process 204 of FIG. 2A, any second process of second processes 222 (see FIG. 2B) or any second process of second processes 242 (see FIG. 2C). Further, the application acted upon by operations listed below can be, for example, any application selected from applications 206, 208 and 210 of FIG. 2A, applications 224, 226 and 228 of FIG. 2B, and applications 244, 246, 248 and 250 of FIG. 2C.

(a) automatically restart first process 202 (see FIG. 2A) in response to a termination of the first process, (b) start an application in response to the processing of command (2) listed above, (c) restart an application in response to the processing of command (9) listed above, (d) monitor the status or performance of an application via, for example, periodically obtaining a status of the application at pre-defined intervals, (e) redirect standard-output from one device that was set as a default device to another device, (f) redirect standard-error from one device that was set as a default device to another device, (g) limit a usage of resources by an application, and (h) send a status of an application to process state portion 216 (see FIG. 2A, 2B or 2C), where first process 202 (see FIG. 2A, 2B or 2C) is capable of retrieving the status from the process state portion 216 (see FIG. 2A, 2B or 2C), and where the sending of the status is performed periodically at pre-defined time intervals.

In one embodiment, operation (a) listed above is available only if the computing node that includes the first process to be restarted (e.g., first process 202 of FIG. 2A, 2B or 2C) also includes one or more untrusted applications. Further, operation (a) is performed by a second process (not shown in FIG. 2A, 2B or 2C) that is executed on the computing node that includes the first process to be restarted and controls only the execution of that first process, rather than by second process 204 of FIG. 2A, second processes 222 of FIG. 2B or second processes 242 of FIG. 2C.

As compared to the commands issued by first process 202, the operations performed by the second processes (e.g., second processes 204) are simpler in functionality and require only system calls (e.g., Linux system calls), such as fork, wait, etc. This relative simplicity in functionality allows each second process to have substantially less code size and code complexity as compared to the first process. Further, the relative functional simplicity of a second process that controls an untrusted application facilitates the continued operability of the second process in response to a failure of the untrusted application.

Other features provided by the first process and the at least one second process executing on a computing node include remote process control of applications 206, 208, 210 and a means to monitor, report on, and limit the resource usage of the applications. Further, the present invention uniquely identifies each instance of multiple instances of an application running on the same computing node. In addition to a computing node identifier, the present invention maintains an instance identifier along with an application identifier. The combination of these identifiers allows a unique identification of an instance on any computing node in a cluster.

Example 1

As one example of the monitoring and control process of FIG. 3, a configuration of computing node 240 is provided. In this example, each reference numeral corresponds to a reference numeral in FIG. 2C, but it will be understood that the steps of this example can also be implemented in the computing node configuration of FIG. 2A or FIG. 2B. Computing node 240 executes untrusted application 244 and one other application 246. It will be understood that the other application can also be a trusted application such as application 248 or 250. The steps of an execution of an application are included in Example 2 presented below. Second process 242-1 functions as the parent application to the untrusted application 244. As a parent application, second process 242-1 is capable of obtaining a status of application 244. Computing node 240 also executes first process (i.e., status request process) 202 and second processes (i.e., control processes) 242-1 and 242-2.

In this example, a process external to computing node 240 sends a first request for a status of application 244, and also sends a second request for a status of application 246. First process 202 receives and processes the first request and the second request. Second process 242-1 controls the execution of application 244 and second process 242-2 controls the execution of application 246. Controlling the execution of an application includes, for example, starting, stopping and restarting the application.

Second process 242-1 periodically sends the status of application 244 to the process state portion 216 of shared memory 212. Similarly, second process 242-2 periodically sends the status of application 246 to the process state portion 216. The periodic sending of these statuses occurs at pre-defined intervals. Process state portion 216 receives the statuses of application 244 and 246. The processing of the first and second requests by first process 202 includes obtaining the statuses of application 244 and 246 from process state portion 216.

Due to a fault in the code of untrusted application 244, application 244 fails and its execution is terminated. Second process 242-1 continues executing, and sends a status (i.e., a failure status) indicating the failure of application 244 to process state 216 at a time indicated by the aforementioned pre-defined intervals. First process 202 retrieves the failure status from process state 216, thereby making the failure status available to any external process that requests the status of application 244.

Although the execution of application 244 has terminated, monitoring and control capabilities of first process 202 and second process 242-2 are preserved. These preserved monitoring and control capabilities include a capability of first process 202 to receive and process requests for the statuses of applications 244 and 246, and a capability of second process 242-2 to control the execution of application 246.

The aforementioned successful retrieval of the status of application 244 by first process 202 is one example of preserving the aforementioned capability of first process 202 in response to the failure of application 244, and the present invention's isolation of the failure of application 244 from the rest of the computing system (i.e., the computing system that includes computing node 240). For instance, since first process 202 continues to execute, a command issued by first process 202 that monitors or controls another application (e.g., application 246, 248 or 250) is successfully received and processed (e.g., by the second process 242 that communicates with the application being monitored or controlled via the command) even though application 244 has failed.

Example 2

Figure 4:
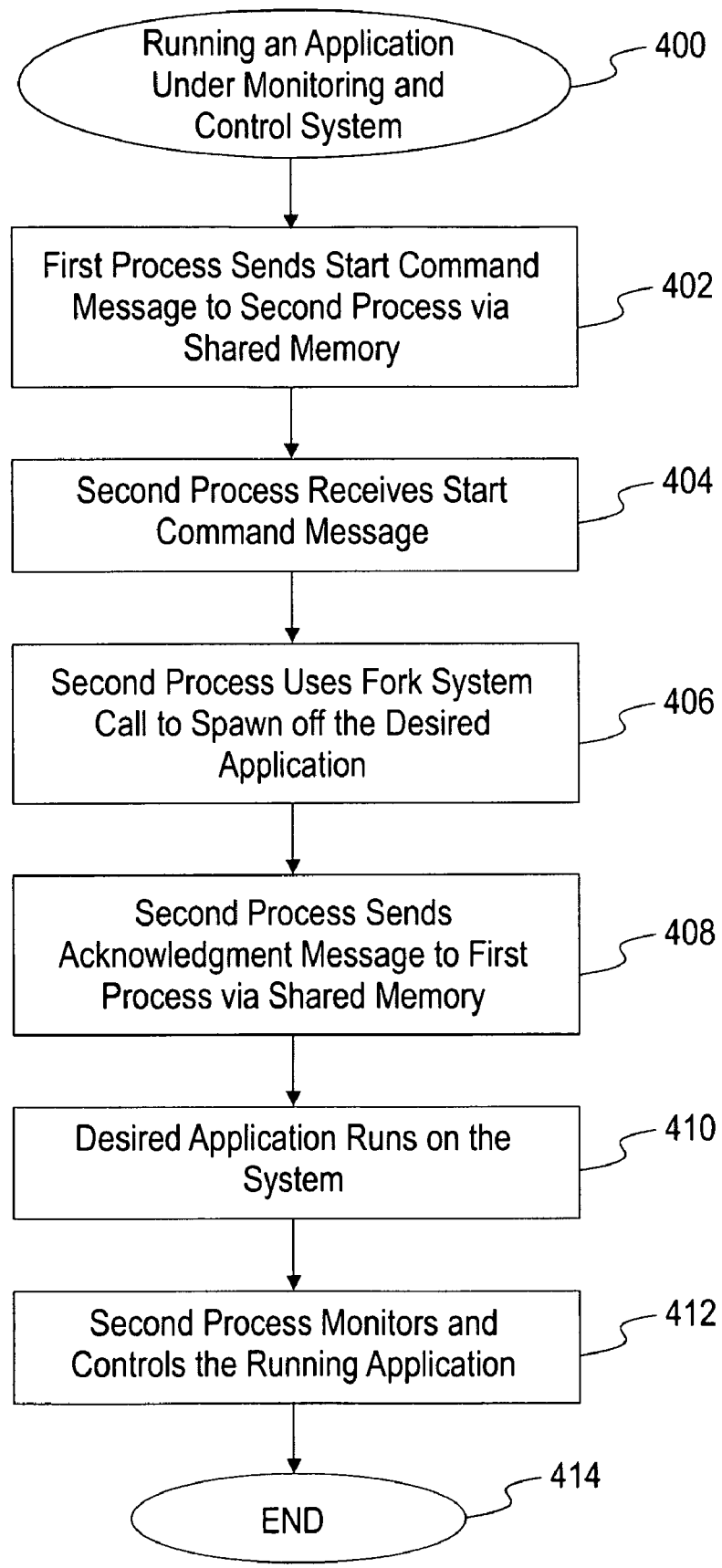
FIG. 4 is a flow chart of an exemplary process of executing an application on a computing node of FIG. 2A, 2B or 2C, in accordance with embodiments of the present invention.

FIG. 4 is a flow chart of an exemplary process of executing an application on a computing node of FIG. 2A, 2B or 2C, in accordance with embodiments of the present invention. In this example, reference numerals refer to components of FIG. 2B, and the application to be executed is application 224, but it will be understood that the steps in this example can also be implemented to execute an analogous application in the computing node configuration of FIG. 2A or FIG. 2C.

The application execution process begins at step 400. In step 402, first process 202 sends a start command message to second process 222-1 via request portion 214 of shared memory 212. The start command message indicates that an execution of application 224 is to be initiated. In step 404, second process 222-1 receives the start command message from request portion 214 of shared memory 212. In step 406, second process 222-1 utilizes a fork system to spawn off application 224. In step 408, second process 222-1 sends an acknowledgment message (i.e., a message acknowledging receipt of the start command) to first process 202 via shared memory 212. In step 410, application 224 executes on computing node 220. In step 412, second process 222-1 utilizes one or more of the operations (a)-(h) listed above to monitor and control application 224 as it executes on computing node 220. The application execution process of FIG. 4 ends at step 414.

Computing System

Figure 5:
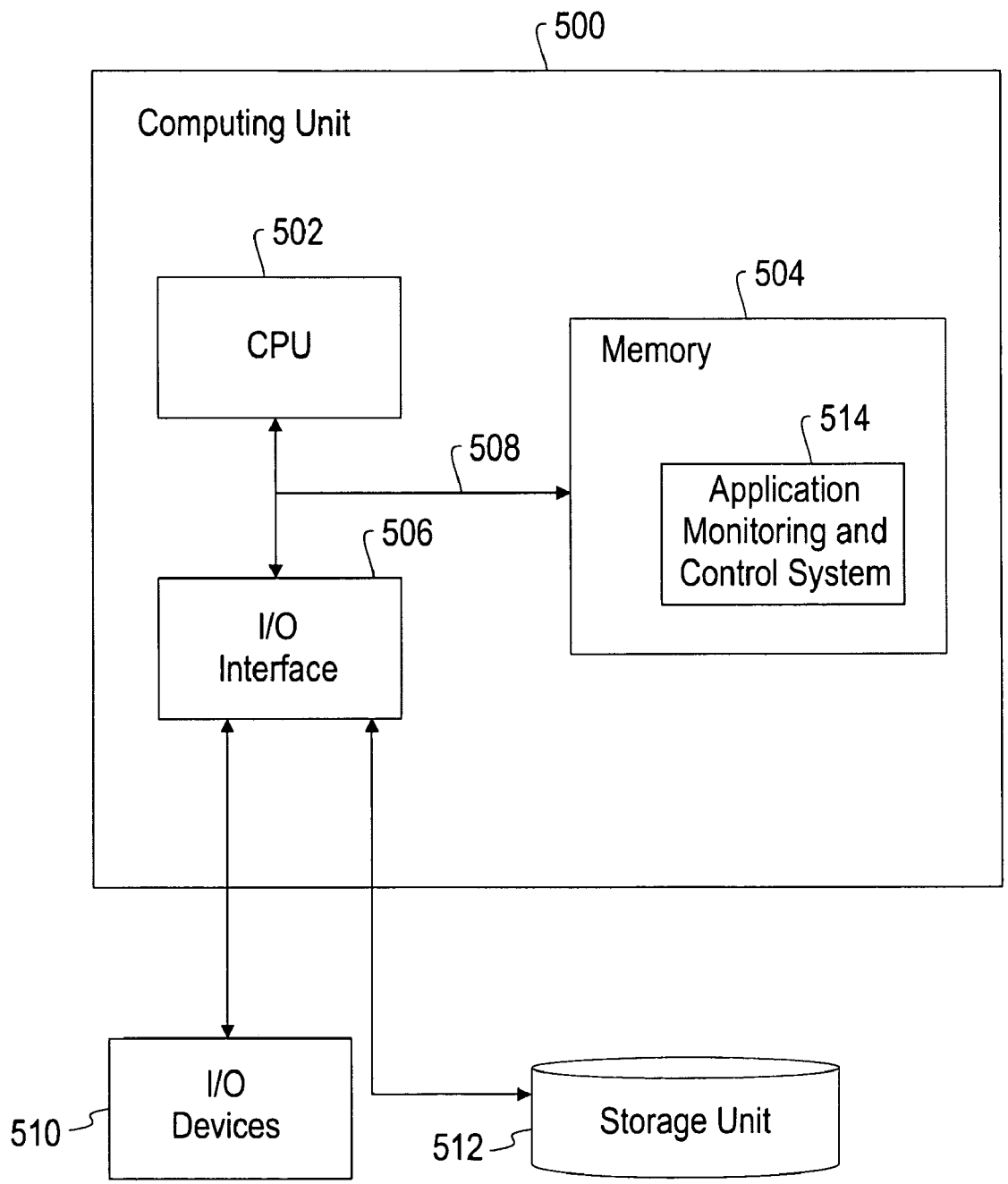
FIG. 5 is a block diagram of a computing system for implementing the process of FIG. 3, in accordance with embodiments of the present invention.

FIG. 5 is a block diagram of a computing unit 500 for implementing the process of FIG. 3, in accordance with embodiments of the present invention. Computing unit 500 is suitable for storing and/or executing program code of application monitoring and control system 514, and generally comprises a central processing unit (CPU) 502, a memory 504, an input/output (I/O) interface 506, a bus 508, I/O devices 510 and a storage unit 512. CPU 502 performs computation and control functions of computing unit 500. CPU 502 may comprise a single processing unit, or be distributed across one or more processing units in one or more locations (e.g., on a client and server).

Memory 504 may comprise any known type of data storage and/or transmission media, including bulk storage, magnetic media, optical media, random access memory (RAM), read-only memory (ROM), a data cache, a data object, etc. Memory 504 includes computer program code comprising application monitoring and control system 514. Local memory elements of memory 504 are employed during actual execution of the program code of application monitoring and control system 514. Cache memory elements of memory 504 provide temporary storage of at least some program code in order to reduce the number of times code must be retrieved from bulk storage during execution. Storage unit 512 is, for example, a magnetic disk drive or an optical disk drive that stores data utilized by application monitoring and control system 514. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown). Still further, memory 504 may include other systems not shown in FIG. 5, such as an operating system (e.g., Linux) that runs on CPU 502 and provides control of various components within and/or connected to computing unit 500.

I/O interface 506 comprises any system for exchanging information to or from an external source. I/O devices 510 comprise any known type of external device, including a display monitor, keyboard, mouse, printer, speakers, hand-held device, printer, facsimile, etc. Bus 508 provides a communication link between each of the components in computing unit 500, and may comprise any type of transmission link, including electrical, optical, wireless, etc.

I/O interface 506 also allows computing unit 500 to store and retrieve information (e.g., program instructions or data) from an auxiliary storage device (e.g., storage unit 512). The auxiliary storage device may be a non-volatile storage device (e.g., a CD-ROM drive which receives a CD-ROM disk). Computing unit 500 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of application monitoring and control system 514 for use by or in connection with a computing unit 500 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The aforementioned medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 504, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of monitoring and controlling applications executing on a plurality of computing nodes of a computing system, comprising:

executing, on a computing node of said plurality of computing nodes, a coordinator process that initiates control of executions of said applications and retrieves statuses of said applications, including an untrusted application and a second application that are capable of being executed on said computing node, wherein said untrusted application is designated as likely to experience a failure based on pre-defined criteria, and wherein said second application is different from said untrusted application;

said computing node executing a first control process that controls a first execution of said untrusted application and executing a second control process that controls a second execution of said second application, wherein said first control process is different from said second control process;

initiating said first execution of said untrusted application;

initiating said second execution of said second application;

subsequent to said executing said first control process, subsequent to said executing said coordinator process, and subsequent to said initiating said first execution of said untrusted application, said first control process controlling said first execution of said untrusted application by sending a first status of said untrusted application to a shared memory accessible by said first and second control processes and by said coordinator process;

subsequent to said executing said second control process, subsequent to said executing said coordinator process, and subsequent to said initiating said second execution of said second application, said second control process controlling said second execution of said second application by sending a second status of said second application to said shared memory;

subsequent to said sending said first status of said untrusted application to said shared memory and subsequent to said sending said second status of said second application to said shared memory, said computing node terminating said first execution of said untrusted application based on said failure of said untrusted application;

said computing node terminating said first control process in response to said terminating said first execution of said untrusted application and based on said failure of said untrusted application;

subsequent to said terminating said first control process and prior to a restart of said first control process, said computing node continuing said executing said coordinator process without said coordinator process terminating in response to said terminating said first control process, said terminating said first execution of said untrusted application, or said failure of said untrusted application, wherein said continuing said executing said coordinator process includes retrieving said first status of said untrusted application from said shared memory, retrieving said second status of said second application from said shared memory, and sending a command to said second control process via said shared memory to control said second execution of said second application; and subsequent to said first control process terminating and prior to said restart of said first control process, said computing node continuing said executing said second control process without said second control process terminating in response to said terminating said first control process, said terminating said first execution of said untrusted application, or said failure of said untrusted application, wherein said continuing said executing said second control process includes said second control process receiving said command sent by said coordinator process via said shared memory and in response thereto, controlling said second execution of said second application.

2. The method of claim 1, further comprising said computing node executing a plurality of control processes, wherein said executing said plurality of control processes includes said executing said first control process and said second control process, wherein said plurality of control processes controls executions of a plurality of applications including said untrusted application and said second application, wherein said control processes and said applications in said plurality of applications are in a one-to-one correspondence, and wherein each application in said plurality of applications is designated as likely to fail based on said pre-defined criteria.

3. The method of claim 1, further comprising:
said shared memory receiving said first status in response to said sending said first status; and
said coordinator process retrieving said first status from said shared memory subsequent to said shared memory receiving said first status.

4. The method of claim 1, further comprising:
said first control process sending statuses of said untrusted application to said shared memory, each status sent at a corresponding pre-defined interval of a first set of intervals; and
said coordinator process retrieving said sent statuses, each sent status retrieved at a corresponding pre-defined interval of a second set of intervals.

5. The method of claim 1, further comprising:
communicating another command from said coordinator process to said first control process via a request portion of said shared memory, said another command selected from a group consisting of:
a first command to automatically restart said first control process in response to a termination of said first control process,
a second command to start said untrusted application, wherein said communicating said second command initiates a starting of said untrusted application by said first control process,
a third command to stop said untrusted application, wherein said communicating said third command initiates a stopping of said untrusted application by said first control process,
a fourth command to clean-up said untrusted application,
a fifth command to obtain a log of at least one of standard-output and standard-error for said untrusted application, wherein said communicating said fifth command initiates a logging, by said first control process, of at least one of standard-output and standard-error for said untrusted application,
a sixth command to stop a plurality of applications executing on said computing node, wherein said plurality of applications includes said untrusted application and said second application,
a seventh command to obtain a status of each application of said plurality of applications from a process state portion of said shared memory,
an eighth command to obtain said first status from said process state portion of said shared memory,
a ninth command to restart said untrusted application, and
a tenth command to shut down said computing system.

6. The method of claim 5, further comprising:
executing, on said computing node, a third control process that controls an execution of said coordinator process, wherein said execution of said coordinator process is performed by said executing said coordinator process; and
performing an operation selected from a group consisting of:
a first operation to automatically restart said coordinator process in response to a termination of said coordinator process,
a second operation to start said untrusted application, said second operation initiated by said second command,
a third operation to restart said untrusted application, said third operation initiated by said ninth command,
a fourth operation to monitor said untrusted application,
a fifth operation to redirect standard-output from a first device set as a default standard-output device to a second device,
a sixth operation to redirect standard-error from a third device set as a default standard-error device to a fourth device,
a seventh operation to limit a usage of resources by said untrusted application, and
an eighth operation to send each status of said statuses of said untrusted application to said process state portion of said shared memory, said eighth operation performed by said first control process periodically at pre-defined time intervals,
wherein said first operation is performed by said third control process, and
wherein said second operation through said eighth operation inclusive are performed by said first control process.

7. The method of claim 6, further comprising:
communicating said second command to start said untrusted application, said communicating including sending said second command from said coordinator process to said first control process via said request portion of said shared memory;
said first control process receiving said second command;
spawning said untrusted application by said first control process;
said first control process sending a message to said coordinator process via said shared memory to acknowledge said receiving said second command;
initiating a start of an execution of said untrusted application on said computing node; and
monitoring and controlling said untrusted application by said first control process, said monitoring and controlling performed in response to said initiating said start, and said monitoring and controlling including performing, periodically at said pre-defined time intervals, said eighth operation to send each status of said statuses of said untrusted application to said process state portion of said shared memory.

8. The method of claim 1, wherein said shared memory is a System V Inter-Process Communication (IPC) shared memory and said shared memory utilizes System V IPC semaphores.

9. The method of claim 1, wherein said computing system is a distributed computing system or a clustered computing system.

10. A computer system comprising:
   a processor of a computing node of a plurality of computing nodes of said computer system; and
   a computer readable memory unit coupled to said processor, said memory unit containing instructions that when executed by said processor implement a method of monitoring and controlling applications executing on said plurality of computing nodes of said computer system, said method comprising:
      executing, a coordinator process that initiates control of executions of said applications and that receives statuses of said applications, including an untrusted application and a second application that are capable of being executed on said computing node, wherein said untrusted application is designated as likely to experience a failure based on pre-defined criteria, and wherein said second application is different from said untrusted application;
      executing a first control process that controls a first execution of said untrusted application and executing a second control process that controls a second execution of said second application, wherein said first control process is different from said second control process;
      initiating said first execution of said untrusted application;
      initiating said second execution of said second application;
      subsequent to said executing said first control process, subsequent to said executing said coordinator process, and subsequent to said initiating said first execution of said untrusted application, said first control process controlling said first execution of said untrusted application by sending a first status of said untrusted application to a shared memory accessible by said first and second control processes and by said coordinator process;
      subsequent to said executing said second control process, subsequent to said executing said coordinator process, and subsequent to said initiating said second execution of said second application, said second control process controlling said second execution of said second application by sending a second status of said second application to said shared memory;
      subsequent to said sending said first status of said untrusted application to said shared memory and subsequent to said sending said second status of said second application to said shared memory, terminating said first execution of said untrusted application based on said failure of said untrusted application;
      terminating said first control process in response to said terminating said first execution of said untrusted application and based on said failure of said untrusted application;
      subsequent to said terminating said first control process and prior to a restart of said first control process, said computing node continuing said executing said coordinator process without said coordinator process terminating in response to said terminating said first control process, said terminating said first execution of said untrusted application, or said failure of said untrusted application, wherein said continuing said executing said coordinator process includes retrieving said first status of said untrusted application from said shared memory, retrieving said second status of said second application from said shared memory, and sending a command to said second control process via said shared memory to control said second execution of said second application; and
      subsequent to said first control process terminating and prior to said restart of said first control process, said computing node continuing said executing said second control process without said second control process terminating in response to said terminating said first control process, said terminating said first execution of said untrusted application, or said failure of said untrusted application, wherein said continuing said executing said second control process includes said second control process receiving said command sent by said coordinator process via said shared memory and in response thereto, controlling said second execution of said second application.

11. The computer system of claim 10, wherein said method further comprises executing a plurality of control processes, wherein said executing said plurality of control processes includes said executing said first control process and said second control process,
   wherein said plurality of control processes controls executions of a plurality of applications including said untrusted application and said second application, wherein said control processes and said applications in said plurality of applications are in a one-to-one correspondence, and wherein each application in said plurality of applications is designated as likely to fail based on said pre-defined criteria.

12. The computer system of claim 10, wherein said method further comprises:
   said shared memory receiving said first status in response to said sending said first status; and
   said coordinator process retrieving said first status from said shared memory subsequent to said shared memory receiving said first status.

13. The computer system of claim 10, wherein said method further comprises:
   said first control process sending statuses of said untrusted application to said shared memory, each status sent at a corresponding pre-defined interval of a first set of intervals; and
   said coordinator process retrieving said sent statuses, each sent status retrieved at a corresponding pre-defined interval of a second set of intervals.

14. A computer program product for monitoring and controlling applications executing on a plurality of computing nodes of a computing system, the computer program product comprising:
   a computer readable storage medium having computer readable program code stored therein, the computer readable program code comprising:
      computer readable program code for executing a coordinator process that initiates control of executions of said applications and that retrieves statuses of said applications, including an untrusted application and a second application that are capable of being executed on a computing node of said plurality of computing nodes, wherein said untrusted application is designated as likely to experience a failure based on pre-defined criteria, and wherein said second application is different from said untrusted application;

computer readable program code for executing a first control process that controls a first execution of said untrusted application and executing a second control process that controls a second execution of said second application, wherein said first control process is different from said second control process;

computer readable program code for initiating said first execution of said untrusted application;

computer readable program code for initiating said second execution of said second application;

computer readable program code for said first control process controlling, subsequent to said executing said first control process, subsequent to said executing said coordinator process, and subsequent to said initiating said first execution of said untrusted application, said first execution of said untrusted application by sending a first status of said untrusted application to a shared memory accessible by said first and second control processes and by said coordinator process;

computer readable program code for said second control process controlling, subsequent to said executing said second control process, subsequent to said executing said coordinator process, and subsequent to said initiating said second execution of said second application, said second execution of said second application by sending a second status of said second application to said shared memory;

computer readable program code for terminating, subsequent to said sending said first status of said untrusted application to said shared memory and subsequent to said sending said second status of said second application to said shared memory, said first execution of said untrusted application based on said failure of said untrusted application;

computer readable program code for terminating said first control process in response to said terminating said first execution of said untrusted application and based on said failure of said untrusted application;

computer readable program code for continuing, subsequent to said terminating said first control process and prior to a restart of said first control process, said executing said coordinator process without said coordinator process terminating in response to said terminating said first control process, said terminating said first execution of said untrusted application, or said failure of said untrusted application, wherein said continuing said executing said coordinator process includes retrieving said first status of said untrusted application from said shared memory, retrieving said second status of said second application from said shared memory, and sending a command to said second control process via said shared memory to control said second execution of said second application; and computer readable program code for continuing, subsequent to said first control process terminating and prior to said restart of said first control process, said executing said second control process without said second control process terminating in response to said terminating said first control process, said terminating said first execution of said untrusted application, or said failure of said untrusted application, wherein said continuing said executing said second control process includes said second control process receiving said command sent by said coordinator process via said shared memory and in response thereto, controlling said second execution of said second application.

15. The program product of claim 14, wherein said computer readable program code further comprises computer readable program code for executing a plurality of control processes, wherein said executing said plurality of control processes includes said executing said first control process and said second control process, wherein said plurality of control processes controls executions of a plurality of applications including said untrusted application and said second application, wherein said control processes and said applications in said plurality of applications are in a one-to-one correspondence, and wherein each application in said plurality of applications is designated as likely to fail based on said pre-defined criteria.

16. The program product of claim 14, wherein said computer readable program code further comprises:

computer readable program code for said shared memory receiving said first status in response to said sending said first status; and computer readable program code for said coordinator process retrieving said first status from said shared memory subsequent to said shared memory receiving said first status.

17. The program product of claim 14, wherein said computer readable program code further comprises:

computer readable program code for said first control process sending statuses of said untrusted application to said shared memory, each status sent at a corresponding pre-defined interval of a first set of intervals; and computer readable program code for said coordinator process retrieving said sent statuses, each sent status retrieved at a corresponding pre-defined interval of a second set of intervals.

18. The program product of claim 14, wherein said computer readable program code further comprises:

computer readable program code for communicating another command from said coordinator process to said first control process via a request portion of said shared memory, said another command selected from a group consisting of:

a first command to automatically restart said first control process in response to a termination of said first control process, a second command to start said untrusted application, wherein said communicating said second command initiates a starting of said untrusted application by said first control process, a third command to stop said untrusted application, wherein said communicating said third command initiates a stopping of said untrusted application by said first control process, a fourth command to clean-up said untrusted application, a fifth command to obtain a log of at least one of standard-output and standard-error for said untrusted application, wherein said communicating said fifth command initiates a logging, by said first control process, of at least one of standard-output and standard-error for said untrusted application, a sixth command to stop a plurality of applications executing on said computing node, wherein said plurality of applications includes said untrusted application and said second application, a seventh command to obtain a status of each application of said plurality of applications from a process state portion of said shared memory, an eighth command to obtain said first status from said process state portion of said shared memory, a ninth command to restart said untrusted application, and a tenth command to shut down said computing system.

19. The program product of claim 18, wherein said computer readable program code further comprises:

computer readable program code for executing a third control process that controls an execution of said coordinator process, wherein said execution of said coordinator process is performed by said executing said coordinator process; and computer readable program code for performing an operation selected from a group consisting of:

a first operation to automatically restart said coordinator process in response to a termination of said coordinator process, a second operation to start said untrusted application, said second operation initiated by said second command, a third operation to restart said untrusted application, said third operation initiated by said ninth command, a fourth operation to monitor said untrusted application, a fifth operation to redirect standard-output from a first device set as a default standard-output device to a second device, a sixth operation to redirect standard-error from a third device set as a default standard-error device to a fourth device, a seventh operation to limit a usage of resources by said untrusted application, and an eighth operation to send each status of said statuses of said untrusted application to said process state portion of said shared memory, said eighth operation performed by said first control process periodically at pre-defined time intervals, wherein said first operation is performed by said third control process, and wherein said second through said eighth operations inclusive are performed by said first control process.

20. The program product of claim 19, wherein said computer readable program code further comprises:

computer readable program code for communicating said second command to start said untrusted application, said communicating including sending said second command from said coordinator process to said first control process via said request portion of said shared memory;

computer readable program code for said first control process receiving said second command;

computer readable program code for said first control process spawning said untrusted application;

computer readable program code for said first control process sending a message to said coordinator process via said shared memory to acknowledge said receiving said second command;

computer readable program code for initiating a start of an execution of said untrusted application on said computing node; and computer readable program code for monitoring and controlling said untrusted application by said first control process, said monitoring and controlling performed in response to said initiating said start, and said monitoring and controlling including performing, periodically at said pre-defined time intervals, said eighth operation to send each status of said statuses of said untrusted application to said process state portion of said shared memory.

* * * * *